(12) United States Patent
Klein et al.

(10) Patent No.: US 11,911,772 B2
(45) Date of Patent: Feb. 27, 2024

(54) BLADE HEAD FOR GRANULATING STRANDS OF MATERIAL AND GRANULATING APPARATUS HAVING SUCH A BLADE HEAD AND METHOD FOR ASSEMBLING SUCH A BLADE HEAD

(71) Applicant: Coperion GmbH, Stuttgart (DE)

(72) Inventors: Christoph Klein, Kongen (DE); Oleg Rudi, Bietigheim-Bissingen (DE); Tatiana Vlasova, Schwieberdingen (DE); Jürgen Alexander Schweikle, Neckarsulm (DE); Maria Hölzel, Eberdingen (DE); Maximilian Breuer, Stuttgart (DE)

(73) Assignee: COPERION GMBH, Stuttgart (DE)

( * ) Notice: Subject to any disclaimer, the term of this patent is extended or adjusted under 35 U.S.C. 154(b) by 264 days.

(21) Appl. No.: 17/182,778

(22) Filed: Feb. 23, 2021

(65) Prior Publication Data
US 2021/0260599 A1 Aug. 26, 2021

(30) Foreign Application Priority Data
Feb. 25, 2020 (DE) .................... 10 2020 202 402.2

(51) Int. Cl.
| | |
|---|---|
| B02C 18/18 | (2006.01) |
| B02C 18/14 | (2006.01) |
| B26D 1/28 | (2006.01) |
| B26D 7/26 | (2006.01) |
| B29B 9/06 | (2006.01) |
| B29B 7/58 | (2006.01) |

(Continued)

(52) U.S. Cl.
CPC ............ *B02C 18/18* (2013.01); *B02C 18/148* (2013.01); *B26D 1/285* (2013.01); *B26D 7/2614* (2013.01); *B26D 7/2628* (2013.01); *B29B 9/06* (2013.01)

(58) Field of Classification Search
CPC ...... B02C 18/18; B02C 18/148; B02C 18/186
USPC ....................................... 241/292.1
See application file for complete search history.

(56) References Cited

U.S. PATENT DOCUMENTS

| | | |
|---|---|---|
| 3,792,950 A | 2/1974 | Cuff |
| 4,800,792 A | 1/1989 | Bertolotti |

(Continued)

FOREIGN PATENT DOCUMENTS

| | | | |
|---|---|---|---|
| CN | 101966708 A | * | 2/2011 |
| CN | 101966708 A | | 2/2011 |

(Continued)

OTHER PUBLICATIONS

English translate(EP1060857A1), retrieved date Jan. 23, 2023.*

(Continued)

*Primary Examiner* — Matthew Katcoff
*Assistant Examiner* — Mohammed S. Alawadi
(74) *Attorney, Agent, or Firm* — Dinsmore & Shohl LLP

(57) ABSTRACT

A blade head for granulating strands of material comprises a blade carrier and at least one granulating blade fastened thereto. The respective granulating blade is fastened to a positioning component which bears against the blade carrier for the rough positioning of the granulating blade. For fine positioning purposes, at least one adjusting element bears against the respective granulating blade. The blade head permits simple, user-friendly and precise assembly and setting of the respective granulating blade.

16 Claims, 9 Drawing Sheets

(51) Int. Cl.
      *B29C 48/00*      (2019.01)
      *B29C 48/345*    (2019.01)
      *B01J 2/20*       (2006.01)

(56) References Cited

U.S. PATENT DOCUMENTS

| | | |
|---|---|---|
| 5,297,746 A | 3/1994 | McBride et al. |
| 2010/0043616 A1 | 2/2010 | Edelman et al. |
| 2016/0144532 A1* | 5/2016 | Degel .................. B02C 18/186 29/401.1 |

FOREIGN PATENT DOCUMENTS

| | | | | |
|---|---|---|---|---|
| DE | 3126550 A1 * | 9/1980 | | |
| DE | 3126550 A1 | 7/1982 | | |
| DE | 4344801 A1 | 7/1994 | | |
| DE | 102004020898 A1 | 11/2005 | | |
| EP | 0174630 A2 | 3/1986 | | |
| EP | 1060857 A1 * | 12/2000 | ........... | B26D 7/2628 |
| EP | 1060857 A1 | 12/2000 | | |
| EP | 3501773 A1 | 6/2019 | | |

OTHER PUBLICATIONS

English translate (DE3126550A1), retrieved date Jan. 23, 2023.*
English translate (CN101966708A), retrieved date Jan. 23, 2023.*
EP 21156165.9-1014 Search Report dated Jul. 16, 2021.
European Office Action for Application No. 21 156 165.9-1014 dated Aug. 24, 2022, 6 pages.
DE 10 2020 202 402.2 Search Report dated Oct. 2, 2020.

* cited by examiner

BLADE HEAD FOR GRANULATING STRANDS OF MATERIAL AND GRANULATING APPARATUS HAVING SUCH A BLADE HEAD AND METHOD FOR ASSEMBLING SUCH A BLADE HEAD

CROSS-REFERENCES TO RELATED APPLICATIONS

This application claims the priority of German Patent Application, Serial No. DE 10 2020 202 402.2, filed Feb. 25, 2020, the content of which is incorporated herein by reference in its entirety as if fully set forth herein.

FIELD OF THE INVENTION

The invention relates to a blade head for granulating strands of material and to a granulating apparatus having such a blade head and to a method for assembling such a blade head. The invention also relates to an assembly apparatus for the pre-assembly of a granulating blade and of a positioning component.

BACKGROUND OF THE INVENTION

EP 3 501 773 A1 discloses a granulating apparatus for granulating strands of material, said apparatus comprising a perforated plate and a blade head. The blade head has a plurality of granulating blades which are fastened to associated blade arms. For assembly, the respective granulating blade is clamped between the associated blade arm and an adjusting element by means of screws. The adjusting element and thus the associated granulating blade are roughly positioned by means of adjusting screws and subsequently fixed by means of the screws. The granulating blade can subsequently be adjusted by means of threaded pins.

SUMMARY OF THE INVENTION

The invention is based on an object of providing a blade head for granulating strands of material, said blade head permitting simple, user-friendly and precise assembly and setting of a granulating blade.

Said object is achieved by way of a blade head for granulating strands of material, comprising a blade carrier, and at least one granulating blade which is fastened to the blade carrier, wherein the respective granulating blade is fastened to a positioning component, wherein the respective positioning component bears against the blade carrier for the rough positioning of the granulating blade, and wherein at least one adjusting element bears against the respective granulating blade for fine positioning purposes. The respective granulating blade is pre-assembled on the associated positioning component, such that the respective granulating blade is fastened to the associated positioning component. The respective positioning component with the fastened granulating blade is subsequently fastened to the blade carrier or a blade arm in such a way that the respective positioning component bears against the blade carrier or the blade arm and the granulating blade is roughly positioned. By virtue of the fact that the respective granulating blade is fastened to the associated positioning component, the fastening of the positioning component means the granulating blade can be fastened to the blade carrier or a blade arm in a simple and user-friendly manner. The granulating blade is subsequently adjusted or precisely positioned by means of the at least one adjusting element, such that the respective granulating blade is positioned precisely in relation to a perforated plate or a cutting plane of a granulating apparatus.

By virtue of the fact that the respective granulating blade is pre-assembled on the associated positioning component and is roughly positioned as a result of the positioning component bearing against the blade carrier, the assembly of the respective granulating blade, for example when exchanging a granulating blade, is simple and user-friendly. In this way, the time required for exchanging a granulating blade, and thus the downtime of the granulating apparatus and of the associated processing plant, is reduced. In addition, the risk of injury for an operator assembling and setting the respective granulating blade is reduced, since the time spent in the region of a heated perforated plate and in the region of the respective granulating blade or of the blade cutting edge is minimized. Since the granulating blade is roughly positioned during the pre-assembly with the associated positioning component, it is necessary merely for the granulating blade assembled on the blade carrier to be finely positioned or adjusted. In addition, damage to the blade head or to a granulating apparatus having the blade head on account of setting errors is reduced or avoided.

The blade carrier and/or the respective positioning component is produced from a material $M_1$. The material $M_1$ preferably has a thermal conductivity $\lambda_1 \geq 150$ W/m/K, in particular $\lambda_1 \geq 200$ W/m/K, and in particular $\lambda_1 \geq 250$ W/m/K, at 20° C. For the thermal conductivity $\lambda_1$, the following preferably applies: $\lambda_1 \leq 900$ W/m/K, in particular $\lambda_1 \leq 700$ W/m/K, and in particular $\lambda_1 \leq 500$ W/m/K.

The material $M_1$ preferably has a coefficient of thermal expansion $\alpha_1 \geq 16 \cdot 10^{-6}$ 1/K, in particular $\alpha_1 \geq 18 \cdot 10^{-6}$ 1/K, and in particular $\alpha_1 \geq 21 \cdot 10^{-6}$ 1/K, at 20° C. For the coefficient of thermal expansion $\alpha_1$, the following preferably applies: $\alpha_1 \leq 40 \cdot 10^{-6}$ 1/K, in particular $\alpha_1 \leq 35 \cdot 10^{-6}$ 1/K, and in particular $\alpha_1 \leq 30 \cdot 10^{-6}$ 1/K.

The material $M_1$ preferably has a density $\rho_1 \leq 7.0$ g/cm$^3$, in particular $\rho_1 \leq 5.0$ g/cm$^3$, and in particular $\rho_1 \leq 3.0$ g/cm$^3$. For the density $\rho_1$, the following preferably applies: $\rho_1 \geq 0.5$ g/cm$^3$, in particular $\rho_1 \geq 1.0$ g/cm$^3$, and in particular $\rho_1 \geq 1.5$ g/cm$^3$.

The material $M_1$ preferably comprises at least one material from the group aluminium, copper, magnesium and beryllium. The material $M_1$ is preferably an alloy having at least 80% by weight of aluminium.

The respective granulating blade is preferably produced from a material $M_2$. The material $M_2$ preferably has a thermal conductivity $\lambda_2 \geq 15$ W/m/K, in particular $\lambda_2 \geq 50$ W/m/K, in particular $\lambda_2 \geq 85$ W/m/K, at 20° C. For the thermal conductivity $\lambda_2$, the following preferably applies: $\lambda_2 \leq 200$ W/m/K, in particular $\lambda_2 \leq 160$ W/m/K, and in particular $\lambda_2 \leq 120$ W/m/K.

The material $M_2$ preferably has a coefficient of thermal expansion $\alpha_2 \leq 11 \cdot 10^{-6}$ 1/K, in particular $\alpha_2 \leq 9.0 \cdot 10^{-6}$ 1/K, and in particular $\alpha_2 \leq 7.0 \cdot 10^{-6}$ 1/K, at 20° C. For the coefficient of thermal expansion $\alpha_2$, the following preferably applies: $\alpha_2 \geq 1.0 \cdot 10^{-6}$ 1/K, in particular $\alpha_2 \geq 2.0 \cdot 10^{-6}$ 1/K and in particular $\alpha_2 \geq 3.0 \cdot 10^{-6}$ 1/K.

The material $M_2$ preferably has a density $\rho_2 \geq 3.0$ g/cm$^3$, in particular $\rho_2 \geq 5.0$ g/cm$^3$, and in particular $\rho_2 \geq 7.0$ g/cm$^3$. For the density $\rho_2$, the following preferably applies: $\rho_2 \leq 30$ g/cm$^3$, in particular $\rho_2 \leq 25$ g/cm$^3$, and in particular $\rho_2 \leq 20$ g/cm$^3$.

A high cutting quality is obtained by way of the material $M_1$ and/or by way of the material $M_2$ since the heat generated on account of the cutting is dissipated from the respective granulating blade in a comparatively more effective manner and is distributed over the blade carrier, such that a temperature gradient and thermal deformation are reduced. The planar abutment of the respective granulating blade against a perforated plate, and thus the cutting quality, is improved by way of the material $M_2$.

A blade head configured such that the blade carrier forms a receiving space for receiving the respective positioning component, ensures simple, user-friendly and precise assembly and setting of a granulating blade. The receiving space is formed in particular on a side of the blade carrier that faces away from the cutting plane or the perforated plate. The respective receiving space is used for receiving the associated positioning component and preferably the granulating blade fastened thereto. The blade carrier delimits the respective receiving space on at least three sides. The respective receiving space is configured in the form of a recess in the blade carrier or a respective blade arm.

A blade head configured such that a receiving space for receiving the respective positioning component is delimited in part by a first stop, a second stop and a third stop, ensures simple, user-friendly and precise assembly and setting of a granulating blade. The respective receiving space is delimited in part by three stops which extend in pairwise fashion transversely with respect to one another, in particular extend in pairwise fashion perpendicularly with respect to one another. By way of the stops, the respective positioning component and the granulating blade fastened thereto are positioned in an x direction, a y direction and a z direction. The x direction, the y direction and the z direction extend in particular in pairwise fashion perpendicularly with respect to one another and form a Cartesian coordinate system for the respective granulating blade or positioning component. The Cartesian coordinate systems assigned to the positioning components or to the receiving spaces can be transferred into one another in particular as a result of a rotation of the blade head about an axis of rotation.

A blade head configured such that the respective positioning component bears against the blade carrier in an x direction and in a y direction, ensures simple, user-friendly and precise assembly and setting of a granulating blade. The respective positioning component bears directly against the blade carrier in the x direction and the y direction, such that the granulating blade fastened to the positioning component is positioned in the x direction and the y direction. The x direction and the y direction extend transversely, in particular perpendicularly, with respect to one another. By virtue of the fact that the granulating blade is fastened to the associated positioning component, the granulating blade is also positioned in a z direction. The z direction extends transversely, in particular perpendicularly, with respect to the x or the y direction. In the z direction, the respective granulating blade is preferably arranged between the positioning component and the blade carrier, in particular a blade arm. Preferably, the granulating blade bears against the blade carrier, in particular the blade arm.

A blade head configured such that the at least one adjusting element is adjustable in a z direction, ensures simple, user-friendly and precise assembly and setting of a granulating blade. The associated granulating blade is positioned in the z direction, and its position is set, by means of the at least one adjustable adjusting element. Preferably, the at least one adjusting element comprises a threaded portion and/or an actuating portion. A plurality of adjusting elements are preferably assigned to the respective granulating blade. The adjusting elements are arranged substantially parallel to a cutting edge of the granulating blade. The adjusting elements can be adjusted in the z direction, such that the position of the associated granulating blade can be set along the cutting edge.

A blade head configured such that the at least one adjusting element is fastened to the respective positioning component in an adjustable manner, ensures simple, user-friendly and precise assembly and setting of a granulating blade. By virtue of the fact that the at least one adjusting element is fastened to the respective positioning component in an adjustable manner, it is possible for the at least one adjusting element, together with the positioning component and the granulating blade, to be pre-assembled and to subsequently be fastened to the blade carrier or a blade arm. After the granulating blade has been roughly positioned by way of the fastening of the positioning component to the blade carrier, the at least one adjusting element can be adjusted in a simple manner for the fine positioning or precise positioning of the granulating blade. A plurality of adjusting elements are preferably fastened to the respective positioning component in an adjustable manner. The adjusting elements are arranged substantially parallel to a cutting edge of the granulating blade. In this way, it is possible to position the granulating blade precisely along the cutting edge by adjusting the adjusting elements. The at least one adjusting element is preferably fastened to the respective positioning component in such a way that the at least one adjusting element can be adjusted on a side of the positioning component that faces away from the granulating blade or a cutting plane or a perforated plate.

A blade head configured such that at least two fixing through-openings are formed in the respective granulating blade and the respective granulating blade is fastened to the positioning component by means of at least two fixing elements which extend through the at least two fixing through-openings, ensures simple, user-friendly and precise assembly and setting of a granulating blade. The at least two fixing elements are configured for example in the form of screws. For the pre-assembly of the respective granulating blade and of the associated positioning component, the at least two fixing elements are guided through the at least two fixing through-openings of the respective granulating blade and fastened to the positioning component. The fastening is carried out in particular by way of screw-fastening. The at least two fixing through-openings are in particular of elongate configuration. The at least two fixing through-openings are configured for example in the form of elongated holes. The respective granulating blade can be fastened to the positioning component in the desired position by means of the at least two fixing elements and the associated at least two fixing through-openings.

A blade head configured such that the respective granulating blade is arranged between the positioning component and the blade carrier, ensures simple, user-friendly and precise assembly and setting of a granulating blade. By virtue of the fact that the respective granulating blade is arranged between the blade carrier or a blade arm and the associated positioning component, the positioning component is freely accessible on a side that faces away from the cutting plane or the perforated plate. In this way, the positioning component can be fastened to the blade carrier or a blade arm in a simple manner. In addition, the at least one adjusting element is easily accessible when said element has been fastened to the positioning component in an adjustable manner. The respective granulating blade can be fastened, in particular clamped, between the blade carrier and the positioning component in a simple manner.

A blade head configured such that at least one recess for partially receiving at least two fixing elements is formed in the blade carrier, ensures simple, user-friendly and precise assembly and setting of a granulating blade. The respective granulating blade is fastened to the associated positioning component by means of the at least two fixing elements. The at least two fixing elements are configured for example in the form of screws. The respective granulating blade and the associated positioning component are pre-assembled by means of the at least two fixing elements. The respective positioning component and the granulating blade fastened thereto are subsequently fastened to the blade carrier or a blade arm in such a way that the granulating blade is arranged between the blade carrier or a blade arm and the positioning component. Here, that part of the at least two fixing elements which protrudes beyond the respective granulating blade is received in the at least one recess, such that the respective granulating blade bears directly against the blade carrier or a blade arm. The at least one recess is for example of elongate configuration, such that the at least two fixing elements can be received in one recess. Furthermore, each of the fixing elements can be provided with its own recess, such that the blade carrier or a respective blade arm has at least two recesses.

A blade head configured such that the respective positioning component is fastened to the blade carrier, in particular in the region of a receiving space and/or outside of a receiving space for receiving the positioning element, ensures simple, user-friendly and precise assembly and setting of a granulating blade. The respective positioning component is fastened to the blade carrier or a blade arm, such that the associated granulating blade is roughly positioned. The respective positioning component is preferably fastened, for example screw-fastened, in the region of a receiving space for the positioning element and/or outside of a receiving space. A fastening component is preferably fastened to the respective positioning component, said fastening component being fastened in turn to the blade carrier or a blade arm. The fastening component forms, in particular, through-openings through which fixing elements, such as, for example, fixing screws, are guided. The fixing elements are fastened, in particular screw-fastened, to the blade carrier or a blade arm in the region of the receiving space and/or outside of the receiving space. In the region of the receiving space, the fastening takes place in particular at the third stop. The respective granulating blade bears against the third stop.

A blade head configured such that the respective positioning component is fastened to the blade carrier by means of a fastening component, ensures simple, user-friendly and precise assembly and setting of a granulating blade. The respective positioning component and the associated fastening component are fastened to one another during the pre-assembly. On account of the pre-assembly, the respective granulating blade, the associated positioning component and the associated fastening component are thus fastened to one another. The fastening component is subsequently fastened to the blade carrier or a blade arm by means of fixing elements. To this end, the associated positioning component and/or the associated granulating blade have/has through-openings for the fixing elements. The fastening component is fastened to the positioning component in particular on a side opposite to the granulating blade. The fastening component is fastened in particular on a side of the positioning component that faces away from a cutting plane or a perforated plate. In this way, simple fastening of the fastening component by means of the fixing elements is possible. The fastening component is preferably produced from the material $M_1$.

A blade head configured such that the blade carrier comprises at least two blade arms for the fastening of granulating blades and a bearing portion for the rotatable mounting of the at least two blade arms, wherein the at least two blade arms are formed in particular in one part with the bearing portion, ensures simple, user-friendly and precise assembly and setting of a granulating blade. The blade carrier comprises at least two blade arms, preferably at least three blade arms, which are arranged in particular in a rotationally symmetric manner, at an angle of 360° divided by the number of blade arms, about the axis of rotation of the blade carrier. The at least two blade arms extend, proceeding from a central bearing portion which facilitates the formation of an axis of rotation, in a radial direction. The bearing portion is configured for example in the form of a hub. By way of the at least two blade arms and the respective granulating blade fastened thereto, during a revolution of the blade carrier the strands of material are cut in accordance with the number of granulating blades. The at least two blade arms and the bearing portion are in particular formed in one part with one another. A granulating blade is preferably fastened to each blade arm. The respective blade arm forms a receiving space for receiving the associated positioning component and the associated granulating blade.

The invention is also based on an object of providing a granulating apparatus for granulating strands of material, said granulating apparatus permitting simple, user-friendly and precise assembly and setting of a granulating blade.

Said object is achieved by way of a granulating apparatus for granulating strands of material, comprising a perforated plate for generating strands of material, a blade head according to the invention, which is arranged on a downstream side of the perforated plate for the purpose of generating a granulate from the strands of material, and a drive device for rotationally driving the blade head about an axis of rotation. The advantages of the granulating apparatus according to the invention correspond to the already described advantages of the blade head according to the invention. The granulating apparatus is used in particular for the granulation of strands of plastics material which are generated from a plastics melt. The axis of rotation of the blade head is arranged concentrically or eccentrically with respect to the perforated plate. The granulating apparatus is configured for example in the form of a hot-melt granulating apparatus, in which the cutting of granulate takes place in a dry state, or in the form of an underwater granulating apparatus.

The invention is also based on an object of providing a method which permits simple, user-friendly and precise assembly of a blade head.

Said object is achieved by way of a method for assembling a blade head, having the steps of:
  providing a blade carrier,
  fastening a granulating blade to a positioning component,
  fastening the positioning component with the fastened granulating blade to the blade carrier in such a way that the granulating blade takes a first position relative to the blade carrier, and
  adjusting the granulating blade by means of at least one adjusting element in such a way that the granulating blade takes a second position relative to the blade carrier.

The advantages of the method according to the invention correspond to the already described advantages of the blade head according to the invention. The respective granulating blade and the associated positioning component are initially pre-assembled and subsequently fastened to the blade carrier or a blade arm in such a way that the granulating blade takes a first position relative to the blade carrier or a blade arm. The granulating blade is roughly positioned as a result of the fastening of the positioning component. The roughly positioned granulating blade is subsequently adjusted or precisely set by means of the at least one adjusting element, such that the granulating blade takes a second position relative to the blade carrier or a blade arm. The second position is determined in particular by a cutting plane in which the cutting edge of the granulating blade or the entire granulating blade must be positioned.

Preferably, during the pre-assembly, a fastening component is fastened to the positioning component and/or fixing elements for fastening the positioning component and/or the fastening component to the positioning component and/or to the fastening component are arranged in a captive manner. The at least one adjusting element is preferably fastened to the positioning component in an adjustable manner. The granulating blade, the positioning component, the at least one adjusting element, the fastening component and the fixing elements preferably form a pre-assembled blade unit. The pre-assembled blade unit is subsequently fastened to the blade carrier or a blade arm by means of the fixing elements, such that the granulating blade assumes the first position. The pre-assembly is performed in particular by means of an assembly apparatus.

The invention is also based on an object of providing an assembly apparatus which permits simple, user-friendly and precise pre-assembly of a granulating blade and of a positioning component.

Said object is achieved by way of an assembly apparatus for the pre-assembly of a granulating blade and of a positioning component, having at least two assembly stops for arranging the positioning component and the granulating blade in a defined position relative to one another. The positioning component and the associated granulating blade are positioned in a defined position relative to one another by means of the at least two assembly stops, such that the positioning component and the granulating blade can be connected to one another in said position. The at least two assembly stops preferably extend at an acute angle relative to one another. Preferably, two assembly stops are used for arranging the positioning component in a defined position in the assembly apparatus, wherein one of the assembly stops is used for arranging the granulating blade on the positioning component in a defined position. At least one of the assembly stops is preferably settable. The at least two assembly stops are formed for example by a base body and/or at least one adjustable stop element, for example an adjusting screw, which is arranged in the base body. Preferably, the assembly apparatus has at least one further stop for arranging the granulating blade in the defined position. The base body of the assembly apparatus preferably forms at least one cutout for receiving at least one adjusting element and/or at least one fixing element and/or a fastening component.

Further features, advantages and details of the invention become apparent from the following description of one exemplary embodiment.

DESCRIPTION OF THE PREFERRED EMBODIMENT

Figure 1:
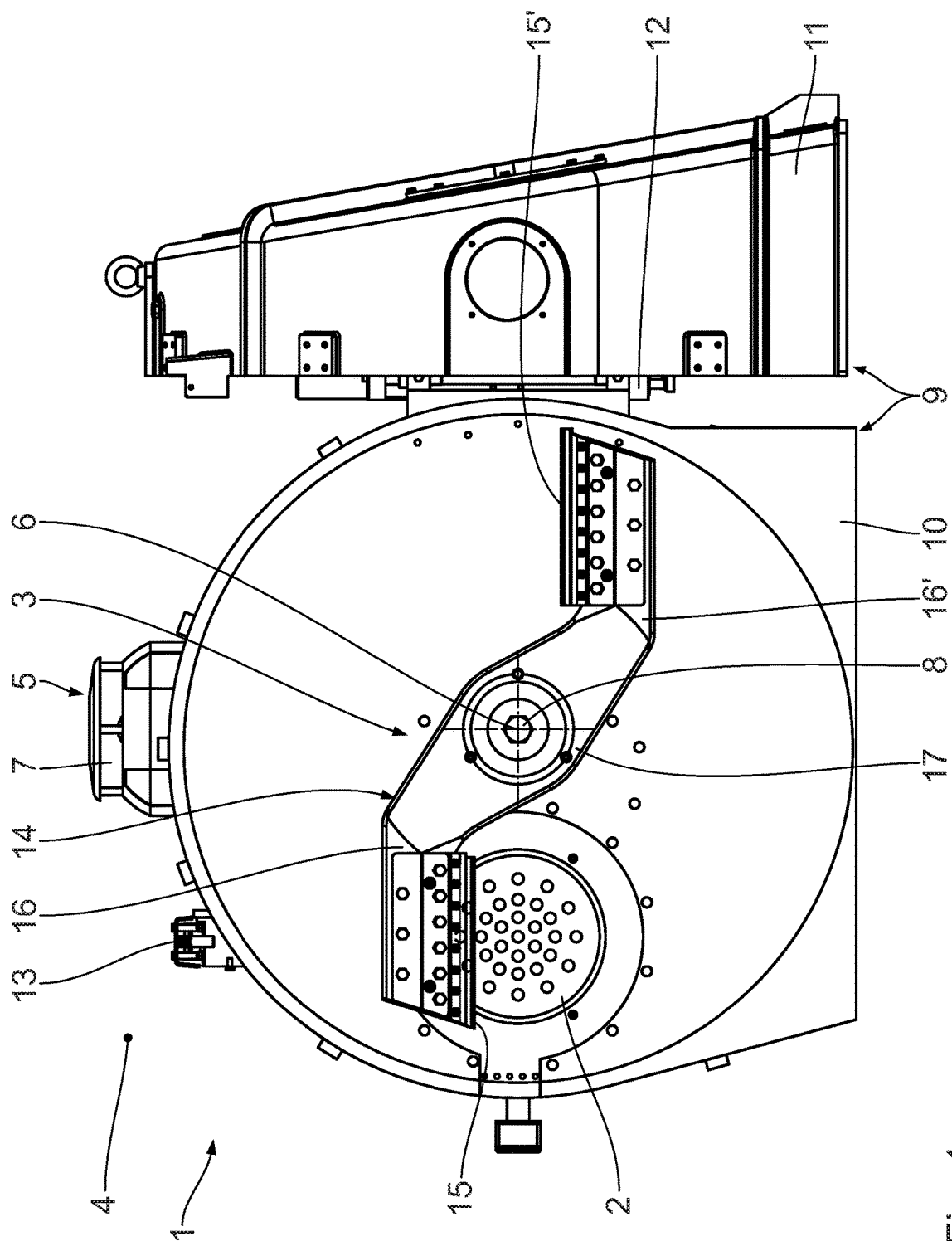
FIG. 1 shows a schematic illustration of a granulating apparatus with an open granulating cover for illustration of a blade head which is arranged eccentrically with respect to a perforated plate.
Figure 2:
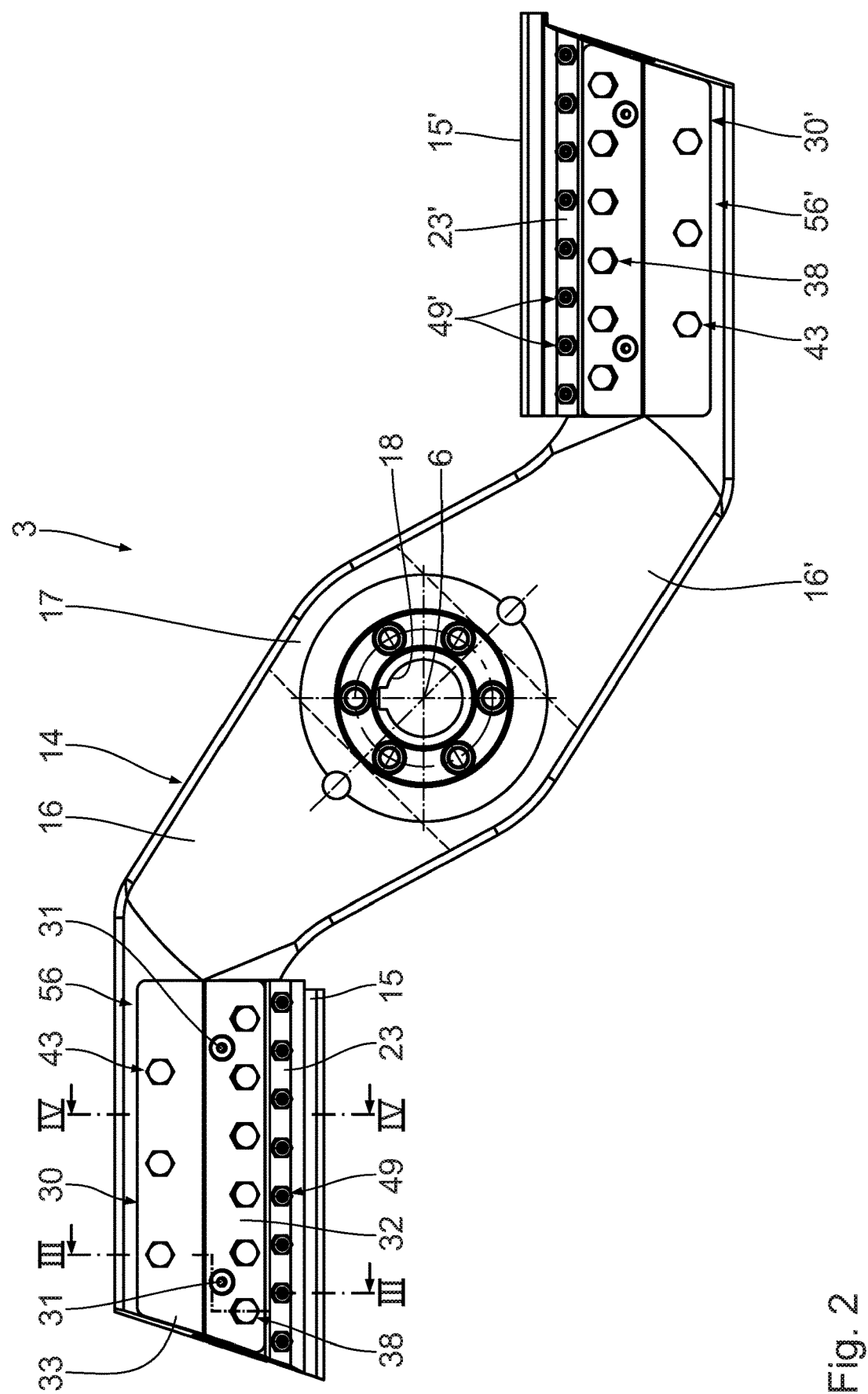
FIG. 2 shows a plan view of the blade head with a blade carrier and granulating blades fastened thereto.
Figure 3:
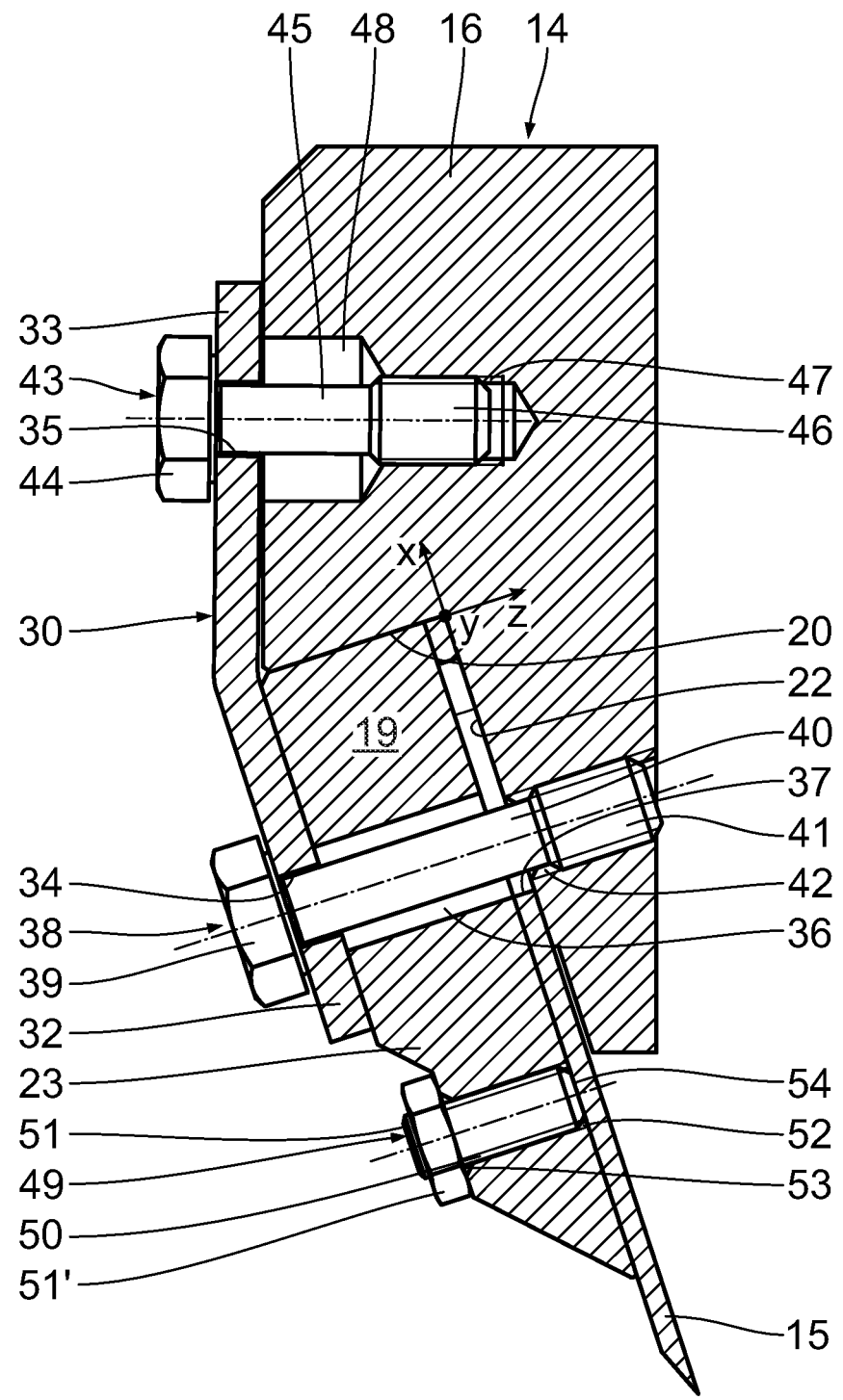
FIG. 3 shows a sectional illustration through the blade carrier and a granulating blade along section line III-III in FIG. 2.

A granulating apparatus 1, illustrated in FIG. 1, comprises a perforated plate 2 for generating strands of material and a blade head 3 for generating a granulate from the strands of material. The blade head 3 is arranged downstream of the perforated plate 2 in a conveying direction 4 of the material melt.

The blade head 3 can be driven in rotation about an axis of rotation 6 by means of a drive device 5. The drive device 5 comprises an electric drive motor 7 which is connected to a drive shaft 8 via an angle gear mechanism which is not illustrated in any more detail. The blade head 3 is connected to the drive shaft 8 in a rotationally fixed manner. The axis of rotation 6 is arranged eccentrically with respect to the perforated plate 2.

The granulating apparatus 1 comprises a granulating cover 9 having a first granulating cover part 10 and a second granulating cover part 11. The granulating cover parts 10, 11 are connected in a pivotable manner by means of a hinge 12 and can be locked in the closed state by means of a locking device 13. The perforated plate 2, the blade head 3 and the drive device 5 are mounted via the first granulating cover part 10. A heating system for heating the perforated plate 2 is arranged to the side of the first granulating cover part 10. The second granulating cover part 11 has an opening on a lower side, such that the cut granulate can fall out of the granulating cover 9 and be transported away.

The granulating apparatus 1 is for example arranged downstream of an extruder which generates the material melt. The material melt is a plastics melt, for example. The granulating apparatus 1 is connected to the extruder for example via a granulating head housing which is not illustrated in any more detail, such that the material melt is fed to the perforated plate 2.

The blade head 3 comprises a blade carrier 14 to which granulating blades 15, 15' are fastened. To this end, the blade carrier 14 has blade arms 16, 16' which, proceeding from a bearing portion 17, extend radially with respect to the axis of rotation 6. The blade arms 16, 16' are formed in one part with the bearing portion 17. The blade arms 16, 16' are arranged in a rotationally symmetric manner about the axis of rotation 6. The bearing portion 17 is configured in the form of a hub and has a receiving bore 18 for the reception and rotationally fixed fastening of the drive shaft 8. The bearing portion 17 is thus arranged concentrically with respect to the axis of rotation 6 and is connected to the drive shaft 8 in a rotationally fixed manner. One of the granulating blades 15, 15' is fastened to each of the blade arms 16, 16' at an end facing away from the bearing portion 17.

The fastening of the granulating blade 15 to the blade arm 16 or the blade carrier 14 is described in detail below. The blade arm 16 forms a receiving space 19 at the end facing away from the bearing portion 17. The receiving space 19 is delimited on three sides by the blade arm 16, such that the blade arm 16 forms a first stop 20, a second stop 21 and a third stop 22. The receiving space 19 is thus delimited in part by the stops 20, 21, 22.

The receiving space 19 is used for receiving a positioning component 23 to which the granulating blade 15 has been fastened by means of two fixing elements 24. The fixing elements 24 are configured in the form of fixing screws. The fixing elements 24 each have a head 25 and a thread 26. In order to receive the respective thread 26, associated internal threads 27 are formed in the positioning component 23. The fixing elements 24 are guided through associated fixing through-openings 28, which are formed in the granulating blade 15, and screw-fastened to the positioning component 23 by means of the thread 26 and the associated internal thread 27, such that the fixing elements 24, by way of their respective head 25, fix the granulating blade 15 to the positioning component 23. The fixing through-openings 28 are of elongate configuration.

The positioning component 23 and the granulating blade 15 fastened thereto are arranged in the receiving space 19 in such a way that the positioning component 23 bears directly against the first stop 20 and the second stop 21 and the granulating blade 15 bears directly against the third stop 22. The granulating blade 15 is thus positioned by means of the first stop 20 in an x direction, by means of the second stop 21 in a y direction, and by means of the third stop 22 in a z direction, relative to the blade arm 16. The x direction, the y direction and the z direction each extend perpendicularly with respect to the associated stop 20, 21, 22 or with respect to the faces formed by the stops 20, 21, 22. The stops 20, 21, 22 extend in pairwise fashion perpendicularly with respect to one another, such that the x direction, the y direction and the z direction form a Cartesian coordinate system. In the z direction, the granulating blade 15 is arranged between the blade arm 16 and the positioning component 23. In order to receive the respective head 25 of the fixing elements 24, associated recesses 29 are formed in the blade arm 16 in the region of the third stop 22.

The positioning component 23 is fastened to the blade arm 16 by means of a fastening component 30. The fastening component 30 is fastened to the positioning component 23 on a side opposite to the granulating blade 15 by means of fixing elements 31. The fixing elements 31 are configured in the form of fixing screws, which are guided through the fastening component 30 and screw-fastened to the positioning component 23. The fastening component 30 comprises a first portion 32, which bears against the positioning component 23, and a second portion 33, which bears against the blade arm 16.

In the first portion 32, a plurality of through-openings 34 are formed along the y direction. The positioning component 23 and the granulating blade 15 have corresponding through-openings 36, 37 through which an associated fixing element 38 is guided. The respective fixing element 38 comprises a head 39, a middle portion 40 and a threaded portion 41. The head 39 of the respective fixing element 38 bears against the fastening component 30, such that the middle portion 40 extends through the through-opening 36 of the positioning component 23 and the through-opening 37 of the granulating blade 15 and the threaded portion 41 is screw-fastened to an internal thread 42 formed in the blade arm 16. The respective internal thread 42 is formed in the region of the third stop 22. The respective through-opening 34 and the respective middle portion 40 are formed in such a way that the respective fixing element 38 is captively retained by the fastening component 30 during pre-assembly. The through-openings 36, 37 have a free cross section which is greater than the cross section of the middle portion 40 and the cross section of the threaded portion 41. The positioning component 23 is thus fastened to the blade arm 16 in the region of the receiving space 19 by means of the fixing elements 38.

Correspondingly, in the second portion 33, a plurality of through-openings 35 are formed along the y direction. The second portion 33 is fastened to the blade arm 16 by means of fixing elements 43. The respective fixing element 43 is configured in the form of a fixing screw. The respective fixing element 43 comprises a head 44, a middle portion 45 and a threaded portion 46. The respective threaded portion 46 is screw-fastened to an internal thread 47 which is formed in the blade arm 16. The respective internal thread 47 extends from a respective recess 48 formed in the blade arm 16. The respective recess 48 has a cross section which is greater compared with a cross section of the middle portion 45 and of the threaded portion 46. The respective through-opening 35 and the associated middle portion 45 are formed in such a way that the respective fixing element 43 is captively retained by the fastening component 30 during pre-assembly.

In order to adjust the granulating blade 15 which is fastened to the blade arm 16, a plurality of adjusting elements 49 are arranged on the positioning component 23. The adjusting elements 49 are arranged along the y direction, that is to say substantially parallel to a cutting edge S of the granulating blade 15. The adjusting elements 49 each comprise a threaded portion 50 and an actuating portion 51. The positioning component 23 comprises a through-bore 53 for each adjusting element 49. An internal thread 52 is formed in the respective through-bore 53 over the entire length thereof. The respective threaded portion 50 is screw-fastened to the internal thread 52, such that the adjusting element 49 bears with an adjusting stop 54 against the granulating blade 15. The adjusting stop 54 can be adjusted in the z direction as a result of rotation of the adjusting element 49. The actuating portion 51 is used to rotate the adjusting element 49. The respective actuating portion 51 comprises an inner hexagon socket, for example. The respective adjusting element 49 comprises a locknut 51' for securing purposes.

The granulating blade 15' is fastened to a positioning component 23' in a corresponding manner and positioned in a receiving space 19' by means of a first stop 20', a second stop 21' and a third stop 22'. The stops 20', 21' and 22' delimit the receiving space 19' in a corresponding manner in an associated x direction, a y direction and a z direction. The positioning component 23' with the granulating blade 15' fastened thereto is correspondingly fastened to the blade arm 16' by way of a fastening component 30', and the granulating blade 15' can be adjusted or positioned by means of adjusting elements 49'.

Figure 4:
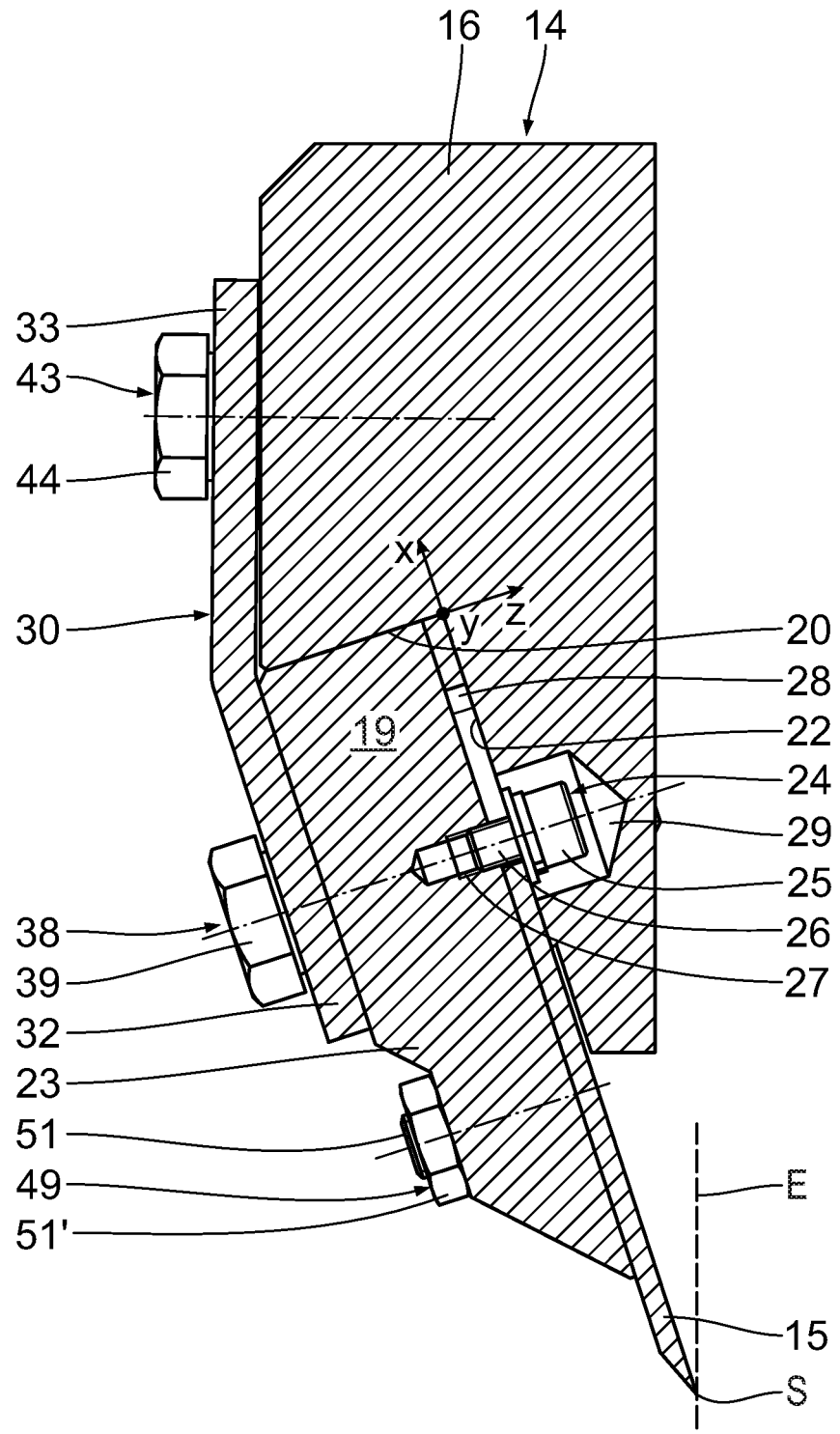
FIG. 4 shows a sectional illustration through the blade carrier and a granulating blade along section line IV-IV in FIG. 2.
Figure 5:
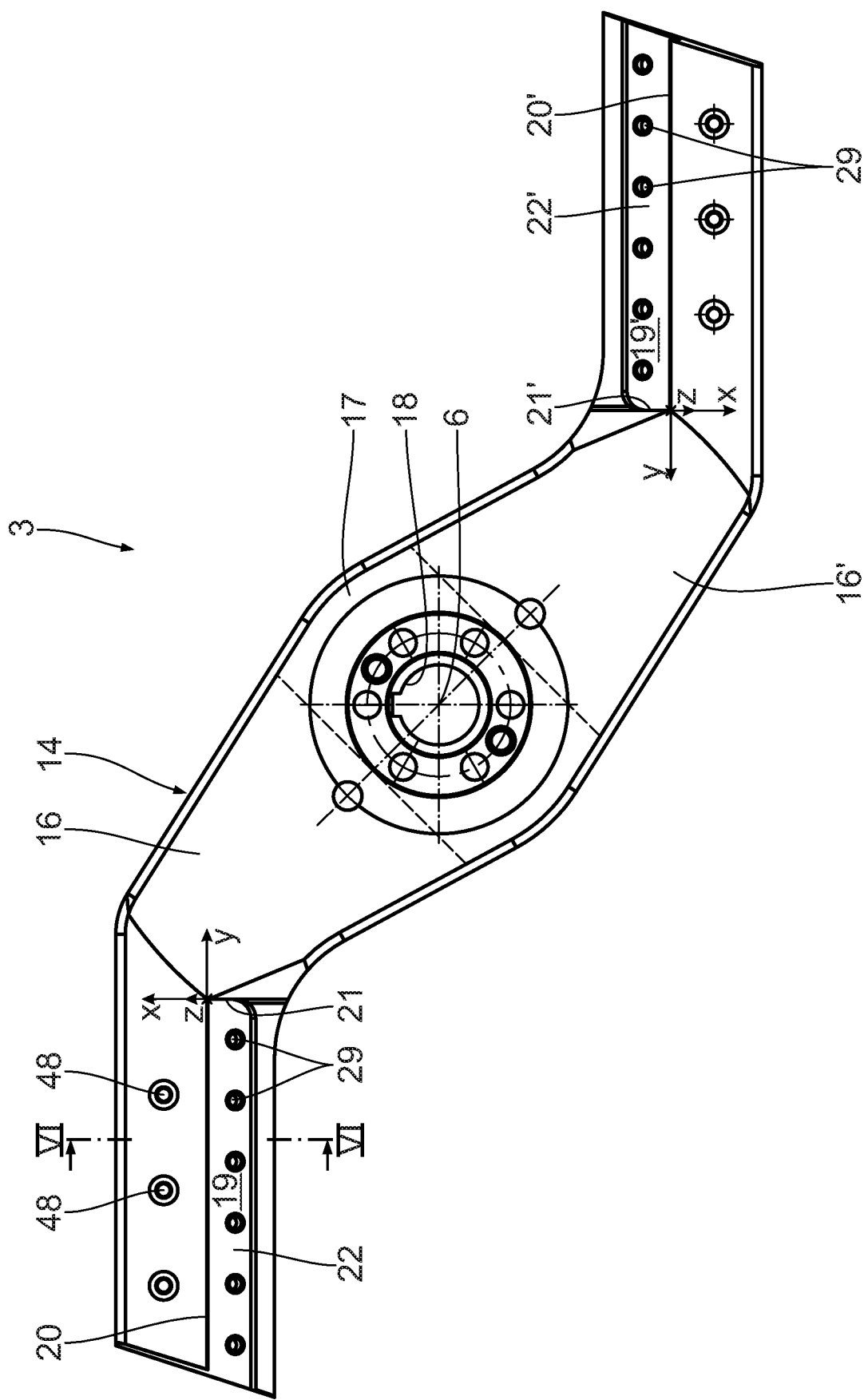
FIG. 5 shows a plan view of the blade carrier in FIG. 2 without the granulating blades.
Figure 6:
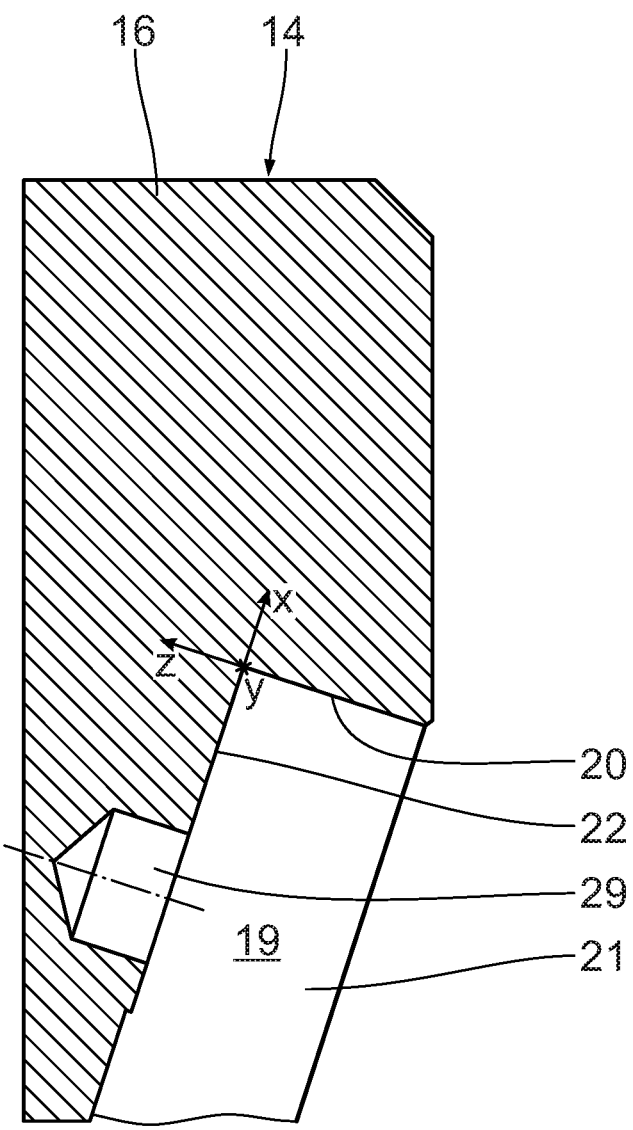
FIG. 6 shows a sectional illustration through the blade carrier along section line VI-VI in FIG. 5.
Figure 7:
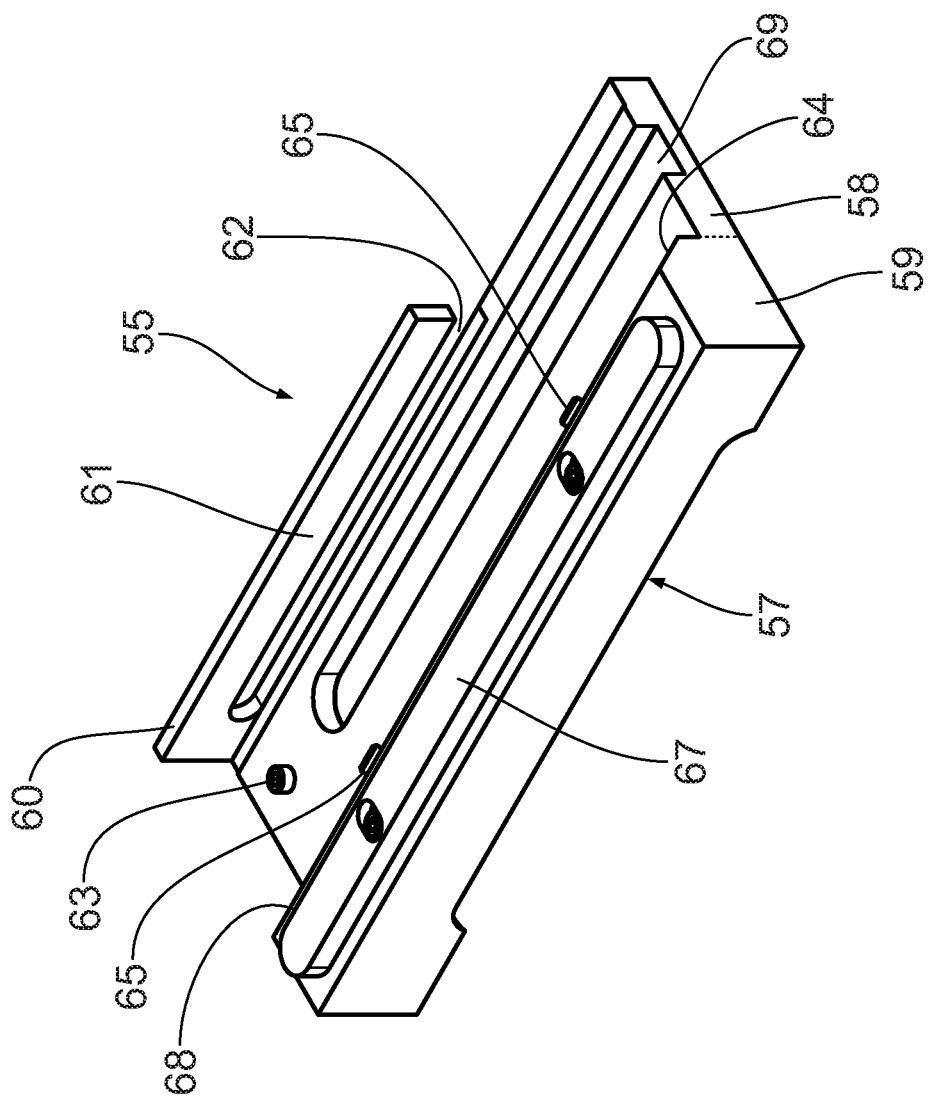
FIG. 7 shows an isometric view of an assembly apparatus for pre-assembling a granulating blade on a positioning component.
Figure 8:
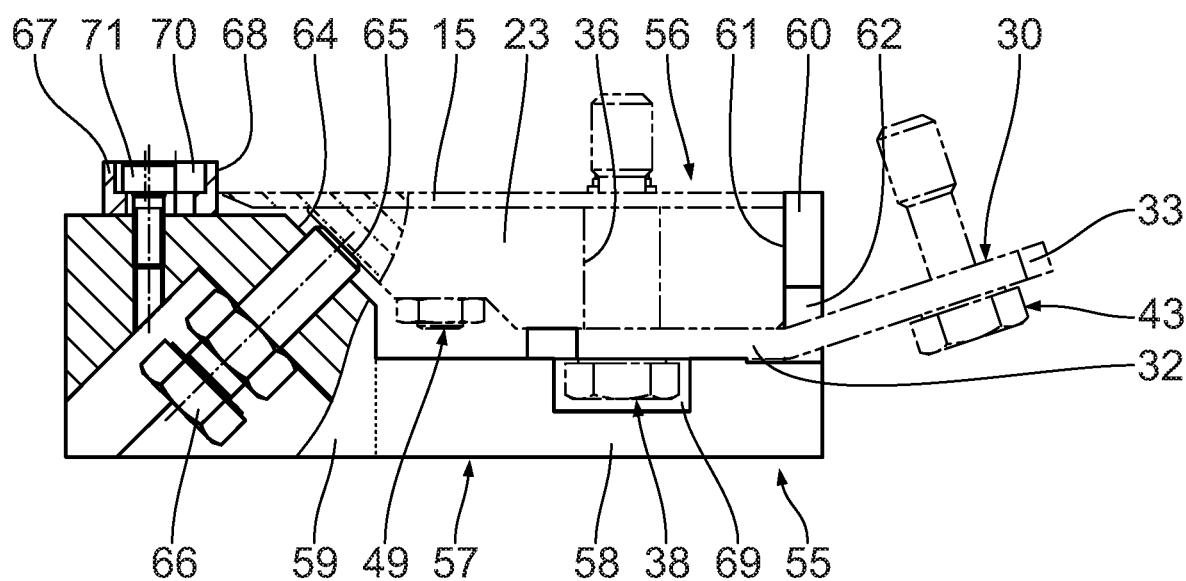
FIG. 8 shows a partially cut-away illustration of the assembly apparatus and of a pre-assembled blade unit comprising the granulating blade and the positioning component.
Figure 9:
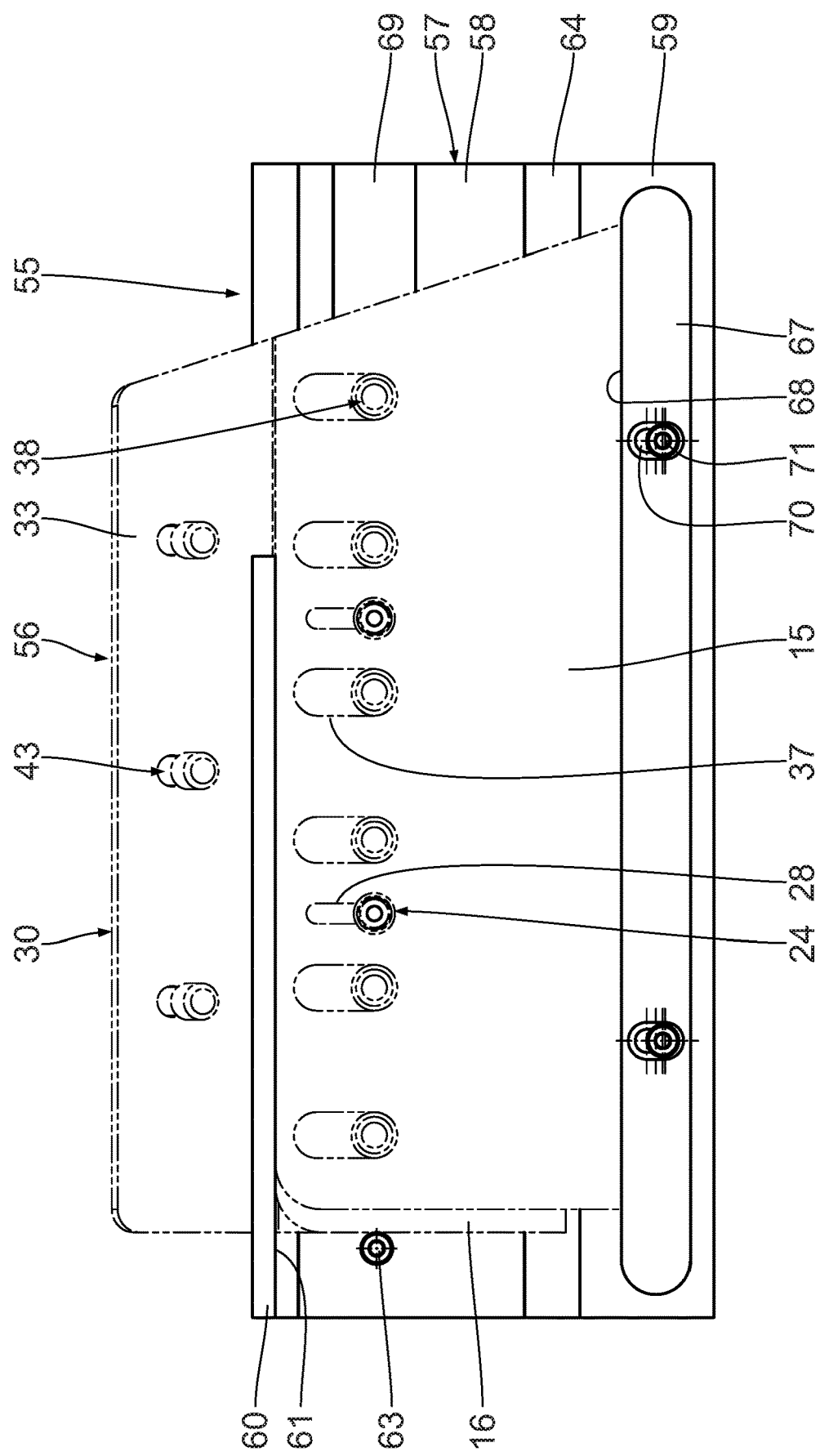
FIG. 9 shows a plan view of the assembly apparatus and the pre-assembled blade unit in FIG. 8.

The perforated plate 2 defines a cutting plane E in dependence on a desired spacing from the cutting edges S of the granulating blades 15, 15'. The cutting plane E is illustrated in FIG. 4. The respective receiving space 19, 19' is formed on a side of the blade carrier 14 or of the blade arms 16, 16' that faces away from the cutting plane E. In a corresponding manner, the fastening components 30, 30' and the adjusting elements 49, 49' are arranged on that side of the blade carrier 14 which faces away from the cutting plane E. In this way, the granulating blades 15, 15' can be exchanged or assembled, adjusted and/or dismantled in a simple manner.

The assembly of the granulating blade 15 on the blade arm 16, and also the positioning of the cutting edge S of the granulating blade 15 in the cutting plane E, is described in detail below. First, a pre-assembled blade unit 56 is produced by means of an assembly apparatus 55.

The assembly apparatus 55 comprises a base body 57, which comprises a first portion 58, a comparatively higher second portion 59 and an L-shaped third portion 60. The second portion 59 and the third portion 60 are arranged oppositely to the first portion 58. The third portion 60 is arranged substantially perpendicularly with respect to the first portion 58, such that the third portion 60 forms a first assembly stop 61. A through-slot 62, which is open towards one side, is formed between the first assembly stop 61 and the first portion 58. A second assembly stop 63 is fastened to the first portion 58. The second assembly stop 63 is configured for example in the form of a dowel pin. The second portion 59 has a bevel 64 towards the first portion 58. Third assembly stops 65 are arranged in the region of the bevel 64. The third assembly stops 65 can be adjusted perpendicularly with respect to the bevel 64. To this end, the third assembly stops 65 are formed at the end of stop elements 66, for example adjusting screws. Fastened to the second portion 59 is a strip 67 which forms a fourth assembly stop 68 towards the first assembly stop 61. For the precise orientation of the fourth assembly stop 68, the strip 67 can be adjusted by means of slots 70 and screws 71. Formed in the first portion 58 is a longitudinal slot 69 which, in a manner corresponding to the through-slot 62, is open towards one side.

In order to pre-assemble the blade unit 56, the fixing elements 38 and 43 are first captively arranged in the through-openings 34, 35 of the fastening component 30. The adjusting elements 49 are screw-fastened in the associated through-bores 53 of the positioning component 23. The fastening component 30 is subsequently screw-fastened to the positioning component 23 by way of the fixing elements 31. Here, the fixing elements 38 are guided through the through-openings 36. The positioning component 23 and the fastening component 30 fastened thereto are then arranged in the assembly apparatus 55 in such a way that that side of the positioning component 23 which lies opposite the fastening component 30 is freely accessible. To this end, the fastening component 30 between the fixing elements 38 and 43 is introduced into the through-slot 62, such that the fixing elements 38 are located in the longitudinal slot 69 and the positioning component 23 bears against the first assembly stop 61 and against the third assembly stops 65. The introduction operation is stopped when the fastening component 30 and/or the positioning component 23 bear/bears against the second assembly stop 63.

In said position, the granulating blade 15 is arranged on the positioning component 23 in such a way that the granulating blade 15 bears against the adjustable fourth assembly stop 68. During the arrangement of the granulating blade 15, the fixing elements 38 are guided through the through-openings 37. The granulating blade 15 is subsequently fastened to the positioning component 23 in the oriented position by means of the fixing elements 24. The pre-assembly of the blade unit 56 is thus concluded. The pre-assembled blade unit 56 is removed laterally from the through-slot 62 and the longitudinal slot 69, and thus from the assembly apparatus 55.

The pre-assembled blade unit 56 is subsequently fastened to the blade arm 16 by means of the fixing elements 38, 43, as a result of which the granulating blade 15 and the positioning component 23 are arranged in the receiving space 19 and are positioned by way of abutment against the stops 20, 21 and 22. The granulating blade 15 or the cutting edge S is thereby positioned in a first position. In the first position, the cutting edge S lies substantially in the cutting plane E.

Subsequently, the cutting edge S is positioned precisely in the cutting plane E by means of the adjusting elements 49. As a result of rotation of the individual adjusting elements 51, the cutting edge S can thus be positioned, along the y direction, precisely in the cutting plane E by way of bending of the granulating blade 15.

The granulating blade 15', the positioning component 23', the fastening component 30' and the adjusting elements 49' are pre-assembled in a corresponding manner, by means of the assembly apparatus 55, to form a blade unit 56'.

The pre-assembly of the blade units 56, 56' reduces the downtime of the granulating apparatus 1 and of the extruder connected thereto. In addition, the downtime is reduced as a result of the simple assembly of the blade units 56, 56' on the blade carrier 14. As a result of the fastening of the blade units 56, 56' to the blade carrier 14 by means of the fixing elements 38, 43, the respective granulating blade 15, 15' is already roughly positioned, such that it is subsequently necessary merely for the cutting edges S to be positioned precisely or adjusted in the cutting plane E by means of the adjusting elements 49, 49'. By virtue of the fact that the respective receiving space 19, 19' faces away from the cutting plane E, it is possible for the blade units 56, 56' to be assembled, and for the granulating blades 15, 15' to be adjusted, from the side that faces away from the heated perforated plate 2. In this way, it is possible for the granulating blades 15, 15' to be assembled and set in a simple and user-friendly manner. Since the adjusting by means of the adjusting elements 49, 49' takes place after the blade units 56, 56' have been fixed to the blade carrier 14 by means of the fixing elements 38, 43, the setting of the granulating blades 15, 15' is not impaired by any subsequent fastening operation. The setting of the granulating blades 15, 15' is thus possible in a precise manner.

What is claimed is:

1. A blade head for granulating strands of material, comprising:
    a blade carrier, and
    at least one granulating blade which is fastened to the blade carrier,
    wherein the respective granulating blade is pre-assembled and fastened to a positioning component,
    wherein the respective positioning component bears against the blade carrier in an x direction and in a y direction for the rough positioning of the granulating blade, and
    wherein at least one adjusting element bears against the respective granulating blade and the at least one adjusting element is adjustable in a z direction for fine positioning purposes.

2. The blade head according to claim 1, wherein the blade carrier forms a receiving space for receiving the respective positioning component.

3. The blade head according to claim 1, wherein a receiving space for receiving the respective positioning component is delimited in part by a first stop, a second stop and a third stop.

4. The blade head according to claim 1, wherein the at least one adjusting element is fastened to the respective positioning component in an adjustable manner.

5. The blade head according to claim 1, wherein at least two fixing through-openings are formed in the respective granulating blade and the respective granulating blade is fastened to the positioning component by means of at least two fixing elements which extend through the at least two fixing through-openings.

6. The blade head according to claim 1, wherein the respective granulating blade is arranged between the positioning component and the blade carrier.

7. The blade head according to claim 1, wherein at least one recess for partially receiving at least two fixing elements is formed in the blade carrier.

8. The blade head according to claim 1, wherein the respective positioning component is fastened to the blade carrier for receiving the positioning component.

9. The blade head according to claim 8, wherein the respective positioning component is fastened to the blade carrier in at least one of a receiving space for receiving the positioning component and outside of the receiving space.

10. The blade head according to claim 8, wherein the respective positioning component is fastened to the blade carrier by means of a fastening component.

11. The blade head according to claim 8, wherein the blade carrier comprises at least two blade arms for the fastening of granulating blades and a bearing portion for the rotatable mounting of the at least two blade arms.

12. The blade head according to claim 11, wherein the at least two blade arms are formed in one part with the bearing portion.

13. A granulating apparatus for granulating strands of material, comprising:
   a perforated plate for generating strands of material,
   the blade head according to claim 8, which is arranged on a downstream side of the perforated plate for the purpose of generating a granulate from the strands of material, and
   a drive device for rotationally driving the blade head about an axis of rotation.

14. The blade head according to claim 1, wherein the positioning component holds the respective granulating blade.

15. A method for assembling a blade head, having the steps of:
   providing a blade carrier,
   pre-assembling and fastening a granulating blade to a positioning component,
   fastening the positioning component with the fastened granulating blade to the blade carrier in such a way that the positioning component bears against the blade carrier in an x direction and in a y direction and the granulating blade takes a first position relative to the blade carrier, and
   adjusting the granulating blade by means of at least one adjusting element in a z direction in such a way that the granulating blade takes a second position relative to the blade carrier.

16. The method according to claim 15, wherein the positioning component holds the respective granulating blade.

* * * * *